United States Patent
Shimizu et al.

(10) Patent No.: US 10,348,190 B2
(45) Date of Patent: Jul. 9, 2019

(54) CONVERSION DEVICE FOR CONVERTING VOLTAGE IN A NON-INSULATED MANNER AND METHOD FOR CONTROLLING THE SAME

(71) Applicant: Sumitomo Electric Industries, Ltd., Osaka-shi (JP)

(72) Inventors: Yusuke Shimizu, Osaka (JP); Tetsuo Akita, Osaka (JP); Toshiaki Okumura, Osaka (JP); Naoki Ayai, Osaka (JP)

(73) Assignee: SUMITOMO ELECTRIC INDUSTRIES, LTD., Osaka-shi (JP)

( * ) Notice: Subject to any disclaimer, the term of this patent is extended or adjusted under 35 U.S.C. 154(b) by 0 days.

(21) Appl. No.: 15/574,916

(22) PCT Filed: Apr. 4, 2016

(86) PCT No.: PCT/JP2016/061032
§ 371 (c)(1),
(2) Date: Nov. 17, 2017

(87) PCT Pub. No.: WO2017/002419
PCT Pub. Date: Jan. 5, 2017

(65) Prior Publication Data
US 2018/0166979 A1 Jun. 14, 2018

Related U.S. Application Data

(63) Continuation of application No. PCT/JP2016/061032, filed on Apr. 4, 2016.

(30) Foreign Application Priority Data

Jun. 29, 2015 (JP) .................. 2015-129781

(51) Int. Cl.
*H02M 1/44* (2007.01)
*H02M 3/158* (2006.01)
(Continued)

(52) U.S. Cl.
CPC .............. *H02M 1/44* (2013.01); *H02M 1/14* (2013.01); *H02M 3/156* (2013.01); *H02M 3/158* (2013.01);
(Continued)

(58) Field of Classification Search
CPC ........ H02M 3/158; H02M 7/48; H02M 7/5387
See application file for complete search history.

(56) References Cited

U.S. PATENT DOCUMENTS

2015/0270787 A1* 9/2015 Fujisaki .................. H02M 1/08
363/41
2015/0280612 A1* 10/2015 Ide .................... H02M 7/53871
363/98
(Continued)

FOREIGN PATENT DOCUMENTS

| JP | 2002-369544 A | 12/2002 |
| JP | 2005-218157 A | 8/2005 |

(Continued)

*Primary Examiner* — Jue Zhang
*Assistant Examiner* — Lakaisha Jackson
(74) *Attorney, Agent, or Firm* — Baker Botts L.L.P.; Michael A. Sartori

(57) ABSTRACT

Duties of control for DC/AC and DC/DC conversion units are determined by considering electric influences of a filter circuit, a capacitor connected to a DC bus, and a DC reactor for an output voltage command value for supplying an AC voltage to a load. The DC/DC conversion unit is controlled to convert a DC voltage into a DC bus voltage waveform alternately having a period of a pulsating current waveform corresponding to the absolute value of the AC voltage and a period of the DC voltage as a pulsating current minimum value. The DC/AC conversion unit is controlled to perform step-down operation during the period of the DC voltage and thus perform conversion into a waveform of the absolute value of the AC voltage corresponding to the period of the DC voltage, and also to perform polarity inversion per one pulsating current cycle.

2 Claims, 9 Drawing Sheets

(51) Int. Cl.
*H02M 7/5387* (2007.01)
*H02M 1/14* (2006.01)
*H02M 3/156* (2006.01)
*H02M 7/797* (2006.01)
H02M 7/48 (2007.01)
H02M 1/00 (2006.01)
H02J 3/38 (2006.01)

(52) U.S. Cl.
CPC ......... *H02M 7/5387* (2013.01); *H02M 7/797* (2013.01); *H02J 3/383* (2013.01); *H02M 7/48* (2013.01); *H02M 2001/007* (2013.01); *H02M 2001/0054* (2013.01)

(56) References Cited

U.S. PATENT DOCUMENTS

| | | | |
|---|---|---|---|
| 2016/0126863 A1 | 5/2016 | Ayai et al. | |
| 2016/0261206 A1* | 9/2016 | Ayai | H02M 3/04 |
| 2017/0279398 A1* | 9/2017 | Taniguchi | H02M 7/12 |

FOREIGN PATENT DOCUMENTS

| | | |
|---|---|---|
| JP | 2008-220001 A | 9/2008 |
| JP | 2009-247184 A | 10/2009 |
| JP | 5134263 B | 1/2013 |
| WO | 2014/199796 A1 | 12/2014 |

* cited by examiner

CONVERSION DEVICE FOR CONVERTING VOLTAGE IN A NON-INSULATED MANNER AND METHOD FOR CONTROLLING THE SAME

TECHNICAL FIELD

The present invention relates to: a conversion device that is provided in a stand-alone-type power supply device and converts a direct current to an alternating current in a non-insulated manner without using a transformer; and a control method therefor.

BACKGROUND ART

For example, a conversion device (power conditioner) for interconnecting output of a solar battery module with a commercial power grid includes a DC/DC converter and an inverter. The output of the solar battery module is stepped up by the DC/DC converter, and thus a predetermined voltage is supplied to a DC bus to which a smoothing capacitor is connected. On the basis of the voltage of the DC bus, an AC voltage and an AC current are outputted by the inverter (see, for example, Patent Literature 1).

In addition, as a conversion device including a DC/DC converter and an inverter, the following technique is proposed: the DC/DC converter at the preceding stage generates a voltage having a pulsating current waveform, and the inverter at the subsequent stage inverts the polarity of the generated voltage per one pulsating current cycle, thereby generating an AC voltage waveform (see, for example, Patent Literature 2).

In addition, in a power interconnection inverter device composed of a DC/DC converter including a DC reactor and a polarity-switching inverter including an AC reactor, the following technique is proposed: in order to reduce current distortion on the AC side, an intermediate-stage capacitor current is compensated in a feed-forward manner in calculation of a current command value for the DC reactor (see, for example, Patent Literature 3).

CITATION LIST

Patent Literature

PATENT LITERATURE 1: Japanese Laid-Open Patent Publication No. 2009-247184 (FIG. 1)
PATENT LITERATURE 2: Japanese Patent No. 5134263 (FIG. 2, FIG. 3)
PATENT LITERATURE 3: Japanese Laid-Open Patent Publication No. 2002-369544 (paragraphs [0015], [0032])

SUMMARY OF INVENTION

Technical Problem

In the conversion device described in Patent Literature 1, both of the DC/DC converter and the inverter constantly perform high-frequency switching. Therefore, switching loss and loss in the reactor occur over the entire operation period. Thus, it cannot be said that the conversion efficiency is sufficiently high.

In the conversion device described in Patent Literature 2, the inverter at the subsequent stage performs only polarity inversion, and the number of times of the inversion is twice the commercial frequency on the AC side. Therefore, as compared to the conversion device that causes the inverter to perform high-frequency switching as in Patent Literature 1, switching loss and loss in the AC reactor are reduced.

However, in the conversion device in Patent Literature 2, the zero point of the pulsating current waveform becomes a singular point at which differentiation cannot be performed. Therefore, the generated AC waveform is less smooth near its zero cross point, and thus waveform distortion can occur.

In the power interconnection inverter described in Patent Literature 3, in calculation of a DC reactor current command value, an active power component is represented as (grid voltage×DC reactor current command value), and thus voltage drop due to the impedance of the AC reactor is not considered. On the other hand, a reactive power component is represented as (grid voltage×intermediate-stage capacitor current). Here, in calculation of the intermediate-stage capacitor current, voltage drop due to the inductance of the AC reactor is taken into consideration, but voltage to be multiplied with the intermediate-stage capacitor current is the grid voltage, and for this part, voltage drop due to the impedance of the AC reactor is not taken into consideration. Accordingly, the phase of the output voltage is delayed as compared to an ideal output voltage, and thus distortion occurs in the output current. In Patent Literature 3, in order to reduce the distortion, feedback control is performed so that the output current becomes close to a sine wave, by adjusting the amplitude of the intermediate-stage capacitor current command value.

However, in this control method, there is a constraint for avoiding mutual interference between the feedback control of the amplitude of the intermediate-stage capacitor current and the feedback control of the DC/DC converter. Patent Literature 3 indicates that DC reactor current control is performed by a hysteresis comparator, and at this time, the control cycle of the DC/DC converter is equal to the switching cycle. The cycle of the feedback control of the amplitude of the DC capacitor current needs to be sufficiently longer than the switching cycle in order to avoid interference with the control of the DC/DC converter. Therefore, response of the feedback control of the DC capacitor current amplitude is delayed. That is, in such a method relying on feedback control to adjust the output current waveform to a sine wave having less distortion as in Patent Literature 3, a distorted wave flows when the AC reactor current command value varies.

In view of the above conventional problems, an object of the present invention is to, in a DC-to-AC conversion device, suppress loss due to high-frequency switching and achieve smoothness of an AC waveform. Another object of the present invention is to reduce distortion when an AC reactor current command value varies.

Solution to Problem

The present invention is a conversion device which converts a DC voltage inputted from a DC power supply, to an AC voltage in a non-insulated manner and supplies the AC voltage to a load. The conversion device includes: a filter circuit connected to the load and including an AC reactor and a first capacitor; a DC/AC conversion unit provided between the filter circuit and a DC bus; a second capacitor connected to the DC bus; a DC/DC conversion unit provided between the DC bus and the DC power supply and including a DC reactor; and a control unit configured to control the DC/AC conversion unit and the DC/DC conversion unit. The control unit determines duties of control for the DC/AC conversion unit and the DC/DC conversion unit by considering electric influences of the filter circuit, the second capacitor, and the DC reactor for an output voltage command value for supplying the AC voltage to the load, and the control unit controls the DC/DC conversion unit to convert the DC voltage into a DC bus voltage waveform alternately having a period of a pulsating current waveform corresponding to an absolute value of the AC voltage and a period of the DC voltage as a pulsating current minimum value, and controls the DC/AC conversion unit to perform step-down operation during the period of the DC voltage and thus perform conversion into a waveform of the absolute value of the AC voltage corresponding to the period of the DC voltage, and also to perform polarity inversion per one pulsating current cycle.

In addition, the present invention as a method is a control method for a conversion device which converts a DC voltage inputted from a DC power supply, to an AC voltage in a non-insulated manner and supplies the AC voltage to a load, the conversion device including: a filter circuit connected to the load and including an AC reactor and a first capacitor; a DC/AC conversion unit provided between the filter circuit and a DC bus; a second capacitor connected to the DC bus; a DC/DC conversion unit provided between the DC bus and the DC power supply and including a DC reactor; and a control unit configured to control the DC/AC conversion unit and the DC/DC conversion unit. The control method for the conversion device is executed by the control unit and includes: a calculation step of determining duties of control for the DC/AC conversion unit and the DC/DC conversion unit by considering electric influences of the filter circuit, the second capacitor, and the DC reactor for an output voltage command value for supplying the AC voltage to the load; a first conversion step of controlling the DC/DC conversion unit to convert the DC voltage into a DC bus voltage waveform alternately having a period of a pulsating current waveform corresponding to an absolute value of the AC voltage and a period of the DC voltage as a pulsating current minimum value; and a second conversion step of controlling the DC/AC conversion unit to perform step-down operation during the period of the DC voltage and thus perform conversion into a waveform of the absolute value of the AC voltage corresponding to the period of the DC voltage, and also to perform polarity inversion per one pulsating current cycle.

Advantageous Effects of Invention

The conversion device and the control method therefor of the present invention can suppress loss due to high-frequency switching and achieve smoothness of the AC waveform.

DESCRIPTION OF EMBODIMENTS

Figure 1:
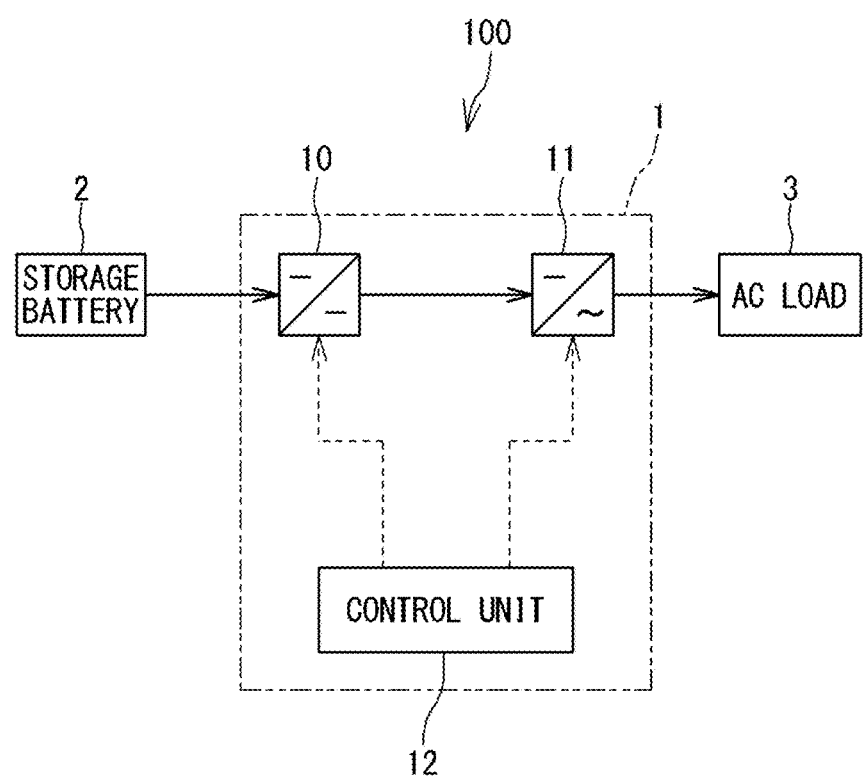
FIG. 1 is a single-line connection diagram showing an example of a stand-alone-type power supply device including a conversion device according to an embodiment of the present invention.

[Summary of Embodiments]
Summary of the embodiments of the present invention includes at least the following.

(1) This is a conversion device which converts a DC voltage inputted from a DC power supply, to an AC voltage in a non-insulated manner and supplies the AC voltage to a load. The conversion device includes: a filter circuit connected to the load and including an AC reactor and a first capacitor; a DC/AC conversion unit provided between the filter circuit and a DC bus; a second capacitor connected to the DC bus; a DC/DC conversion unit provided between the DC bus and the DC power supply and including a DC reactor; and a control unit configured to control the DC/AC conversion unit and the DC/DC conversion unit. The control unit determines duties of control for the DC/AC conversion unit and the DC/DC conversion unit by considering electric influences of the filter circuit, the second capacitor, and the DC reactor for an output voltage command value for supplying the AC voltage to the load, and the control unit controls the DC/DC conversion unit to convert the DC voltage into a DC bus voltage waveform alternately having a period of a pulsating current waveform corresponding to an absolute value of the AC voltage and a period of the DC voltage as a pulsating current minimum value, and controls the DC/AC conversion unit to perform step-down operation during the period of the DC voltage and thus perform conversion into a waveform of the absolute value of the AC voltage corresponding to the period of the DC voltage, and also to perform polarity inversion per one pulsating current cycle.

In the conversion device configured as described above, the DC/DC conversion unit converts the DC voltage into a DC bus voltage waveform alternately having a period of a pulsating current waveform corresponding to the absolute value of an AC voltage and a period of the DC voltage. Further, the DC/AC conversion unit performs step-down operation during the period of the DC voltage to generate a waveform of the absolute value of the AC voltage corresponding to this period, and performs polarity inversion per one pulsating current cycle, thereby generating a desired AC voltage.

Thus, it is possible to provide the conversion device in which loss due to high-frequency switching is suppressed and smoothness of the AC waveform is achieved. In addition, the duties for the respective conversion units are determined by considering an electric influence of the filter circuit including the AC reactor, for example, whereby distortion caused when the AC reactor current command value varies can be suppressed.

(2) In the conversion device of (1), for example, the electric influences are respective voltage changes due to the AC reactor and the DC reactor and respective reactive currents flowing through the first capacitor and the second capacitor.

In this case, appropriate control can be performed by considering voltage changes due to the reactors and the reactive currents of the capacitors for the output voltage command value.

(3) In the conversion device of (1), the control unit at least executes: a calculation for obtaining an AC reactor current command value on the basis of the output voltage command value by considering a current flowing through the first capacitor; a calculation for obtaining the DC bus voltage command value on the basis of the output voltage command value by considering a voltage change due to the AC reactor and a voltage change due to the DC reactor; a calculation for obtaining a reference wave threshold value for the DC/AC conversion unit on the basis of the AC reactor current command value; a calculation for obtaining a DC reactor current command value on the basis of a reactive power due to a current flowing through the second capacitor and a power of the DC/AC conversion unit; and a calculation for obtaining a reference wave threshold value for the DC/DC conversion unit on the basis of the DC reactor current command value.

By performing such calculations, appropriate control can be performed while considering voltage changes due to the reactors and the reactive currents of the capacitors for the output voltage command value.

(4) In another aspect, this is a control method for a conversion device which converts a DC voltage inputted from a DC power supply, to an AC voltage in a non-insulated manner and supplies the AC voltage to a load, the conversion device including: a filter circuit connected to the load and including an AC reactor and a first capacitor; a DC/AC conversion unit provided between the filter circuit and a DC bus; a second capacitor connected to the DC bus; a DC/DC conversion unit provided between the DC bus and the DC power supply and including a DC reactor; and a control unit configured to control the DC/AC conversion unit and the DC/DC conversion unit.

The control method for the conversion device is executed by the control unit and includes: a calculation step of determining duties of control for the DC/AC conversion unit and the DC/DC conversion unit by considering electric influences of the filter circuit, the second capacitor, and the DC reactor for an output voltage command value for supplying the AC voltage to the load; a first conversion step of controlling the DC/DC conversion unit to convert the DC voltage into a DC bus voltage waveform alternately having a period of a pulsating current waveform corresponding to an absolute value of the AC voltage and a period of the DC voltage as a pulsating current minimum value; and a second conversion step of controlling the DC/AC conversion unit to perform step-down operation during the period of the DC voltage and thus perform conversion into a waveform of the absolute value of the AC voltage corresponding to the period of the DC voltage, and also to perform polarity inversion per one pulsating current cycle.

In the control method for the conversion device as described above, the DC/DC conversion unit converts the DC voltage into a DC bus voltage waveform alternately having a period of a pulsating current waveform corresponding to the absolute value of an AC voltage and a period of the DC voltage. Further, the DC/AC conversion unit performs step-down operation during the period of the DC voltage to generate a waveform of the absolute value of the AC voltage corresponding to this period, and performs polarity inversion per one pulsating current cycle, thereby generating a desired AC voltage.

Thus, it is possible to suppress loss due to high-frequency switching and achieve smoothness of the AC waveform. In addition, the duties for the respective conversion units are determined by considering an electric influence of the filter circuit including the AC reactor, for example, whereby distortion caused when the AC reactor current command value varies can be suppressed.

[DETAILS OF EMBODIMENTS]

<Power Supply Device>

Hereinafter, embodiments will be described with reference to the drawings.

FIG. 1 is a single-line connection diagram showing an example of a stand-alone-type power supply device 100 including a conversion device according to an embodiment of the present invention. In FIG. 1, a storage battery 2 is connected to one end of a conversion device 1, and an AC load 3 is connected to the other end thereof. In the power supply device 100, the storage battery 2 is caused to discharge a DC power, the DC power is converted to an AC power by the conversion device 1, and then the AC power is supplied to the AC load 3.

The voltage of the storage battery 2 is, for example, about 48 V, and the voltage of the AC load 3 is, for example, about 100 V. It is noted that these voltage values are not limited thereto.

The conversion device 1 includes, as main components: a DC/DC conversion unit 10 provided on the storage battery 2 side; a DC/AC conversion unit 11 provided on the AC load 3 side; and a control unit 12 for controlling operations of these two conversion units.

The control unit 12 includes, for example, a computer, and achieves a control function needed for the two conversion units (10,11) by the computer executing software (computer program). The software is stored in a storage device (not shown) of the control unit 12. It is noted that the control unit 12 may be configured by a circuit formed from only hardware not including a computer.

<Conversion Device>

«Circuit Configuration»

Figure 2:
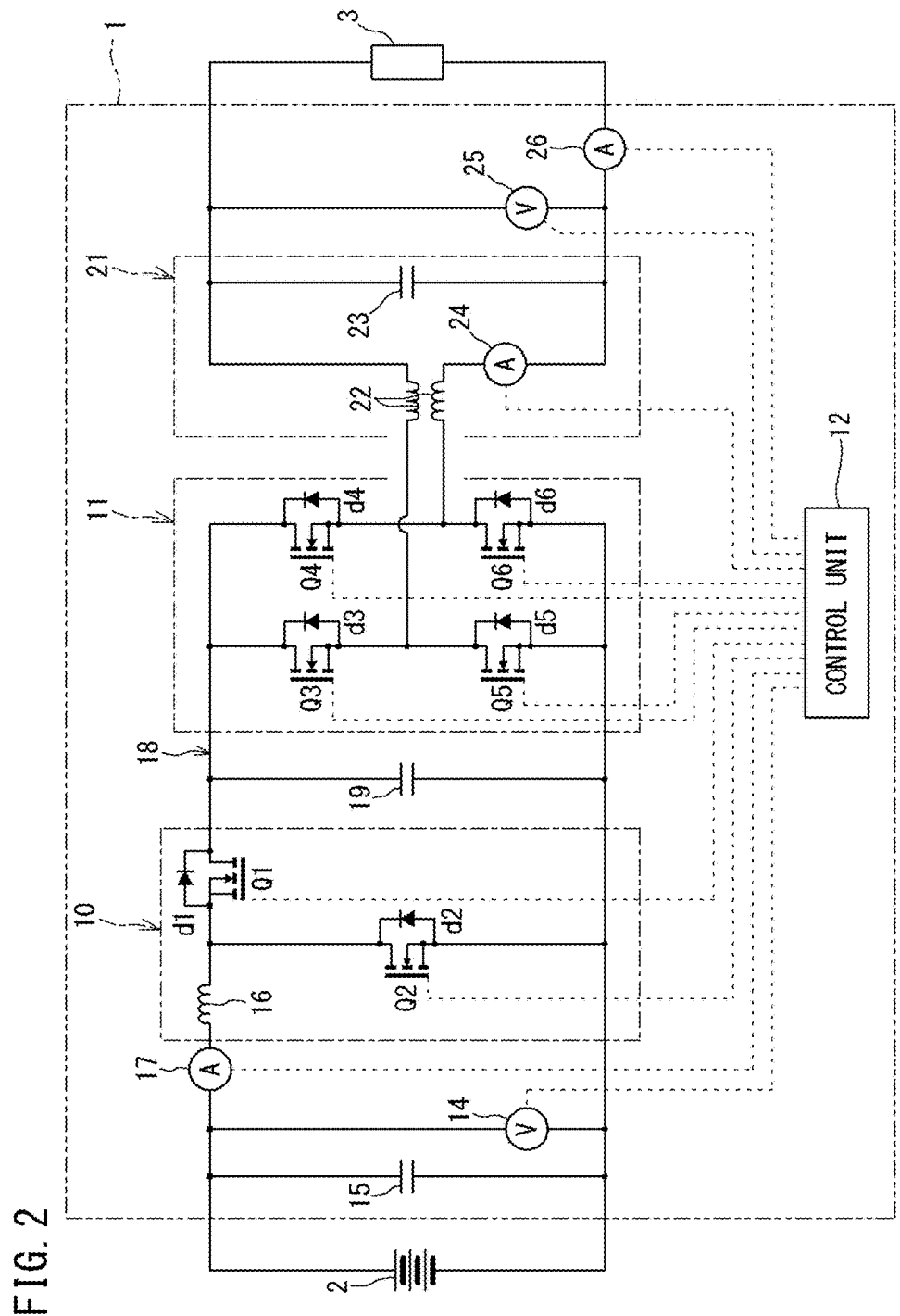
FIG. 2 is an example of a detailed circuit diagram of the conversion device.

FIG. 2 is an example of a detailed circuit diagram of the conversion device 1.

In FIG. 2, a voltage sensor 14, a current sensor 17, and a smoothing capacitor 15 are provided on the low potential side (left side in the drawing) of the DC/DC conversion unit 10. The voltage sensor 14 is connected in parallel with the storage battery 2, and detects the voltage between both ends of the storage battery 2. Information about the detected voltage is provided to the control unit 12. The current sensor 17 detects a current flowing through the DC/DC conversion unit 10. Information about the detected current is provided to the control unit 12.

The DC/DC conversion unit 10 includes a DC reactor 16, a switching element Q1, and a switching element Q2, and forms a DC chopper circuit. As the switching elements Q1,Q2, for example, MOSFETs (Metal-Oxide-Semiconductor Field Effect Transistors) may be used. The switching elements Q1,Q2 formed from MOSFETs have diodes (body diodes) d1, d2, respectively. The switching elements Q1,Q2 are controlled by the control unit 12.

A smoothing capacitor 19 is connected to a DC bus 18 connecting the DC/AC conversion unit 11 and the DC/DC conversion unit 10. The capacitor 19 has a small capacitance (μF level), so that the capacitor 19 exerts a smoothing effect for a voltage subjected to switching at a high frequency (for example, 20 kHz) but does not exert a smoothing effect for a voltage that varies at a frequency (100 Hz or 120 Hz) that is approximately twice a commercial frequency.

The DC/AC conversion unit 11 includes switching elements Q3 to Q6 forming a full-bridge circuit. The switching elements Q3 to Q6 are, for example, MOSFETs. In a case of using MOSFETs, the switching elements Q3 to Q6 have diodes (body diodes) d3 to d6, respectively. The switching elements Q3 to Q6 are controlled by the control unit 12.

A filter circuit 21 is provided between the DC/AC conversion unit 11 and the AC load 3. The filter circuit 21 includes AC reactors 22, and a smoothing capacitor 23 provided on the AC load side (right side in the drawing) with respect to the AC reactor 22. The filter circuit 21 prevents passage of a high-frequency noise occurring at the DC/AC conversion unit 11, so that the noise does not leak to the AC load 3 side. A current sensor 24 is provided for detecting a current flowing through the AC reactor 22. Information about the current detected by the current sensor 24 is provided to the control unit 12.

A voltage sensor 25 is provided in parallel with the capacitor 23 and the AC load 3. A current sensor 26 is provided on an electric path connecting the AC load 3 and the conversion device 1. Information about the voltage detected by the voltage sensor 25 and the information about the current detected by the current sensor 26 are provided to the control unit 12.

«Outline of Operation»

The conversion device 1 configured as described above supplies a power to the AC load 3 on the basis of a discharge power from the storage battery 2. The DC/AC conversion unit 11 and the DC/DC conversion unit 10 alternately perform switching operation during the AC half cycle.

Specifically, during the AC half cycle, there are a period in which the DC/DC conversion unit 10 steps up the DC voltage and the DC/AC conversion unit 11 performs only periodic polarity inversion, and a period in which the DC/DC conversion unit 10 passes its input to be outputted as it is and the DC/AC conversion unit 11 performs a step-down inverter function and polarity inversion.

In FIG. 2, as described above, a capacitance $C_{DCBUS}$ of the capacitor 19 is set to, for example, about several tens of μF so as not to sufficiently smooth the voltage of the DC bus 18. In this case, a sine wave having a less distortion rate can be outputted. In addition, the DC/DC conversion unit 10 and the DC/AC conversion unit 11 each have a switching stop period, and therefore, as compared to a conventional conversion device such as a power conditioner (for example, Patent Literature 1), switching loss decreases and iron loss of the reactor also decreases, so that the conversion efficiency of the device is improved. In addition, according to the conversion device 1, it is possible to improve the conversion efficiency by directly using a known circuit of a non-insulated-type conversion device, without adding any components.

«Specific Example of Control»

Hereinafter, as control by the control unit 12 (a control method executed by the control unit 12), a calculation processing function that the control unit 12 achieves by, for example, execution of a program will be described specifically. It is noted that this is merely an example and is not limited to the process shown below.

(AC Reactor Current Command Value)

Figure 3:
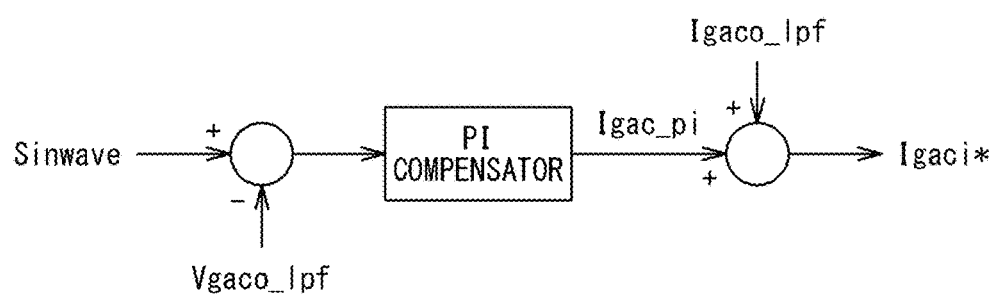
FIG. 3 is a control block diagram for calculating an AC reactor current command value on the basis of an output voltage command value.

FIG. 3 is a control block diagram for calculating an AC reactor current command value Igaci* on the basis of an output voltage command value. To describe briefly, this is a calculation for obtaining the AC reactor current command value on the basis of the output voltage command value by considering a current flowing through the capacitor 23.

In FIG. 3, the output voltage command value is Sinwave (sine wave)=Vsin(ωt), and a value obtained by applying a low-pass filter to an output voltage detection value Vgaco is Vgaco_lpf. The reason for applying the low-pass filter is to smooth the output voltage detection value to a certain extent, because, if the output voltage oscillates due to any factor, the output voltage detection value also naturally oscillates, and the oscillation component makes the control unstable. The cut-off frequency of the low-pass filter is, for example, 1 kHz.

Next, a difference between the output voltage command value Sinwave and the output voltage detection value Vgaco_lpf is inputted to a PI compensator to calculate Igac_pi. Then, a value obtained by applying a low-pass filter having a cut-off frequency of, for example, 60 Hz to an output current detection value Igaco is Igaco_lpf. Then, Igaco_lpf is added to Igac_pi, thereby calculating the AC reactor current command value Igaci*. The reason for applying the low-pass filter to the output current detection value is the same as in the case of Vgaco_lpf.

(DC Bus Voltage Command Value)

Figure 4:
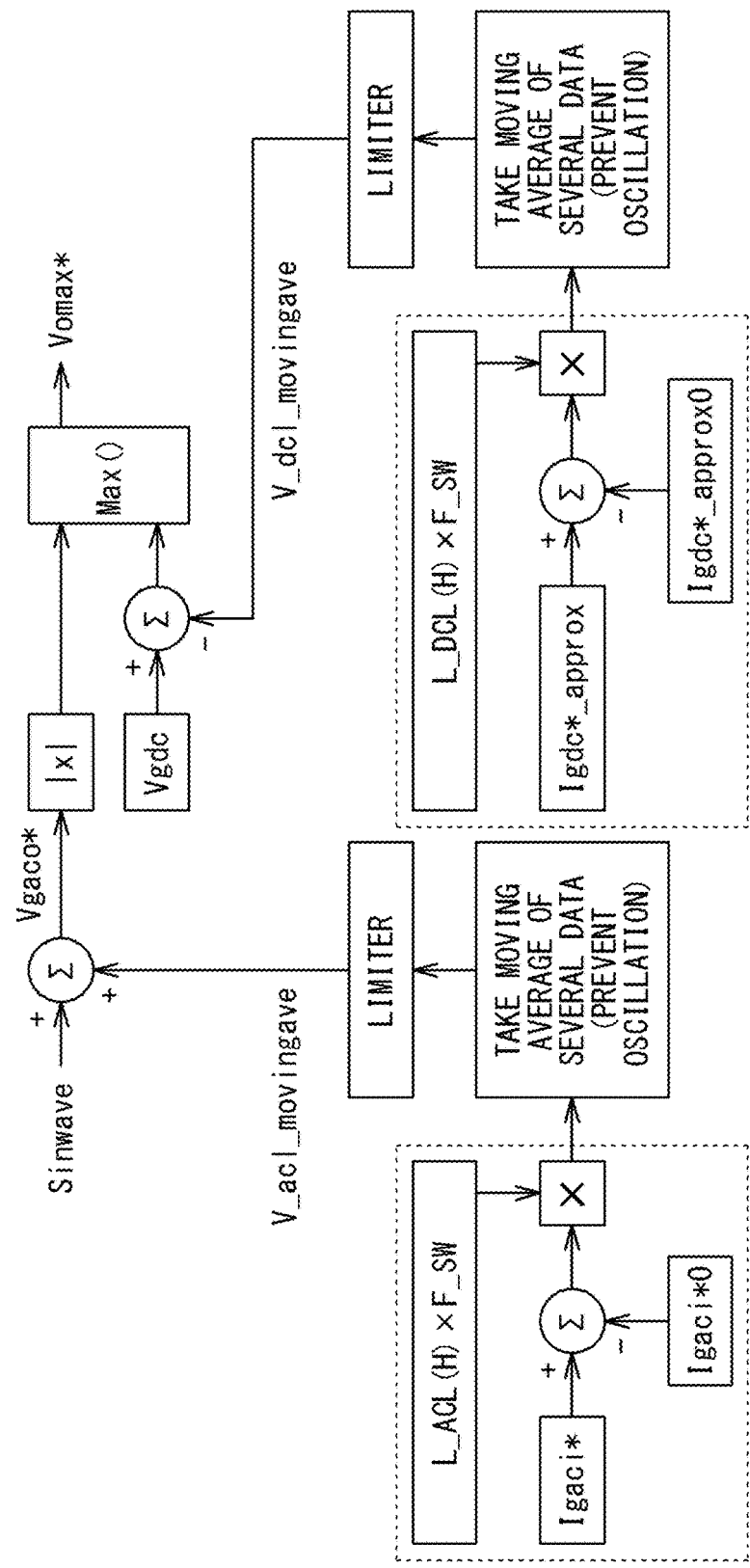
FIG. 4 is a control block diagram for calculating a DC bus voltage command value on the basis of the output voltage command value.

FIG. 4 is a control block diagram for calculating a DC bus voltage command value Vomax* on the basis of the output voltage command value. To describe briefly, this is a calculation for obtaining the DC bus voltage command value on the basis of the output voltage command value by considering a voltage change due to the AC reactor 22 and a voltage change due to the DC reactor 16. A part enclosed by a dotted line at the lower left in the drawing is a block for calculating a voltage change due to an inductance L_AC of the AC reactor 22. Here, the voltage change due to the inductance L_AC of the AC reactor 22 is calculated as:

$$V\_acl=(Igaci^*-Igaci^*0)\times L\_ACL\times F\_SW.$$

In order to stabilize control in current control of the DC reactor 16 described later against the voltage change, a moving average over several control cycles is taken about the values of V_acl in the respective control cycles, to obtain V_acl_movingave.

Then, the output voltage command value Sinwave and V_acl_movingave are added together, to calculate a DC/AC conversion unit voltage command value Vgaco*. It is noted that voltage drop due to a resistance component R_ACL of the AC reactor 22 is not considered here, but in a case of considering this voltage drop, Igaci×R_ACL may be added in the calculation of Vgaco*.

Next, an approximate value Igdc*_approx of the DC reactor current command value, which is approximated without considering a charge/discharge power of an intermediate capacitor, is calculated. If the DC power supply voltage detection value is denoted by Vgdc, the approximate value is represented as follows:

$$Igdc^*\_approx=Igaci^*\times Vgaco^*/Vgdc.$$

Then, as shown in a part enclosed by a dotted line at the right in FIG. 4, a voltage change due to an inductance L_DCL of the DC reactor is calculated as follows:

$$V\_dcl=(Igdc^*\_approx-Igdc^*\_approx0)\times L\_DCL\times F\_SW.$$

Then, the moving average value thereof is calculated as V_dcl_movingave.

Then, a value obtained by subtracting V_dcl_movingave from the DC power supply voltage detection value Vgdc, i.e., (Vgdc−V_dcl_movingave) is compared with an absolute value |Vgaco*| of the DC/AC conversion unit voltage command value Vgaco*, and the greater one is used as the DC bus voltage command value Vomax* (upper right in FIG. 4).

It is noted that, in a case of considering voltage drop due to a resistance component R_DCL of the DC reactor 16, the part (Vgdc−V_dcl_movingave) is replaced with (Vgdc−V_dcl_movingave−Igdc*approx ×R_DCL).

(Changeover Flag)

Here, a switching changeover flag sw_flag for the DC/DC conversion unit 10 and the DC/AC conversion unit 11 is defined as follows.

If Vgdc−V_dcl_movingave>Vomax*, sw_flag=1 (step-down switching operation of DC/AC conversion unit 11).

If Vgdc−V_dcl_movingave≤Vomax*, sw_flag=0 (step-up switching operation of DC/DC conversion unit 10).

The switching changeover flag sw_flag defined as described above is used in AC reactor current control and DC reactor current control described later. A case of sw_flag=1 corresponds to a period during which only the DC/AC conversion unit 11 performs switching operation (high-frequency switching operation), and a case of sw_flag=0 corresponds to a period during which only the DC/DC conversion unit 10 performs switching operation.

(AC Reactor Current Control)

Figure 5:
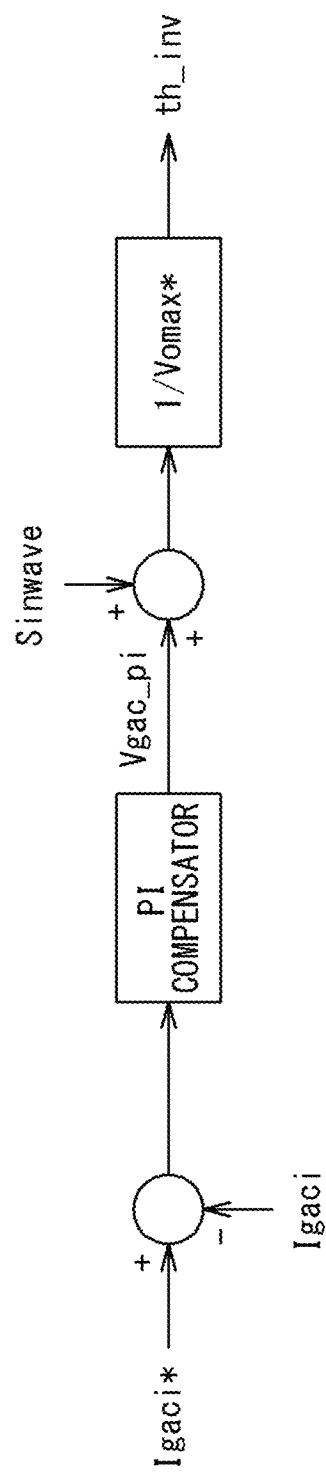
FIG. 5 is a control block diagram of AC reactor current control for calculating a reference wave threshold value for a DC/AC conversion unit.

FIG. 5 is a control block diagram of AC reactor current control for calculating a reference wave threshold value th_inv for the DC/AC conversion unit 11. To describe briefly, this is a calculation for obtaining a reference wave threshold value (duty of control) for the DC/AC conversion unit 11 on the basis of an AC reactor current command value.

In FIG. 5, a difference between the AC reactor current command value Igaci* and an AC reactor current detection value Igaci is inputted to a PI compensator to obtain Vgac_pi, and then the output voltage command value Sinwave is added to the Vgac_pi. The resultant sum value is divided by the DC bus voltage command value Vomax*, thereby determining the reference wave threshold value th inv for the DC/AC conversion unit 11.

(DC Reactor Current Command Value)

Figure 6:
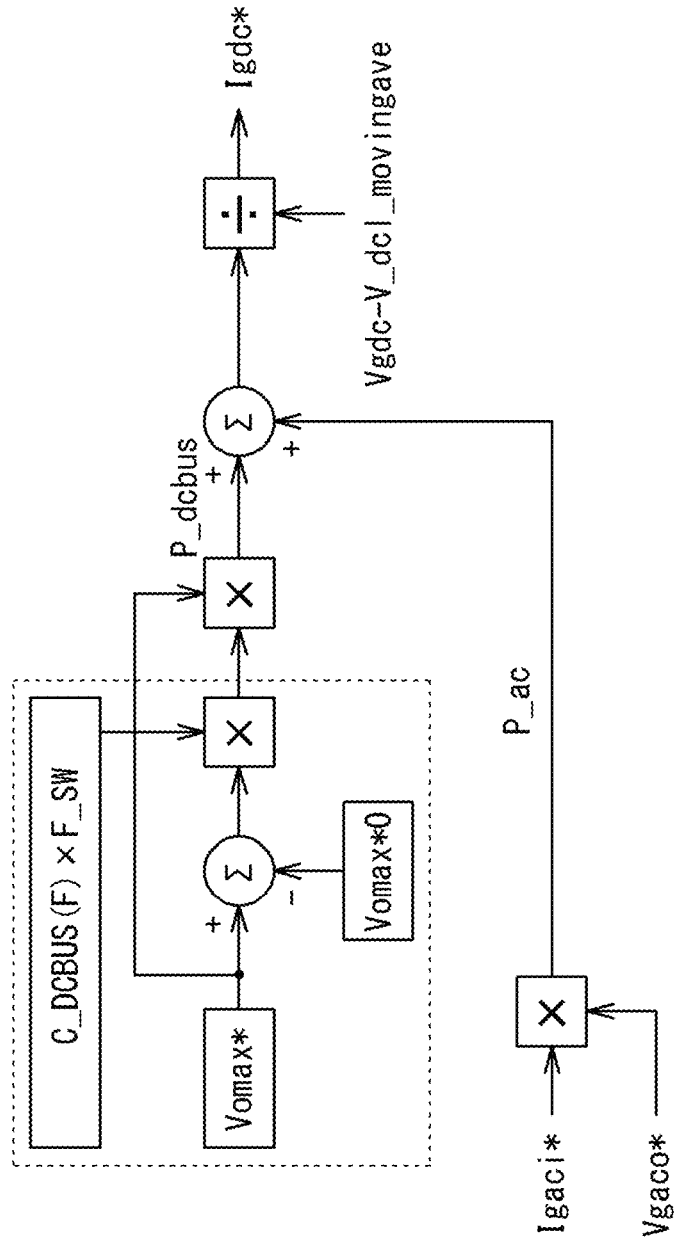
FIG. 6 is a control block diagram for calculating a DC reactor current command value.

FIG. 6 is a control block diagram for calculating the DC reactor current command value Igdc*. To describe briefly, this is a calculation for obtaining the DC reactor current command value on the basis of a reactive power due to a current flowing through the capacitor 19 and a power of the DC/AC conversion unit 11.

A part enclosed by a dotted line in the drawing is a control block for calculating a current flowing through the capacitor 19 at the DC bus 18. Here, a current I_dcbus flowing through the capacitor 19 at the DC bus 18 is represented as follows:

$$I\_dcbus = (Vomax^* - Vomax^*0) \times C\_DCBUS \times F\_SW.$$

A reactive power P_dcbus flowing through the capacitor 19 at the DC bus 18 is represented as follows:

$$P\_dcbus = I\_dcbus \times Vomax^*.$$

An output power command value P_ac is represented as follows:

$$P\_ac = Igaci^* \times Vgaco^*.$$

A sum of P_dcbus and P_ac is divided by (Vgdc−V_dcl_movingave), thereby calculating the DC reactor current command value Igdc*.

(DC Reactor Current Control)

Figure 7:
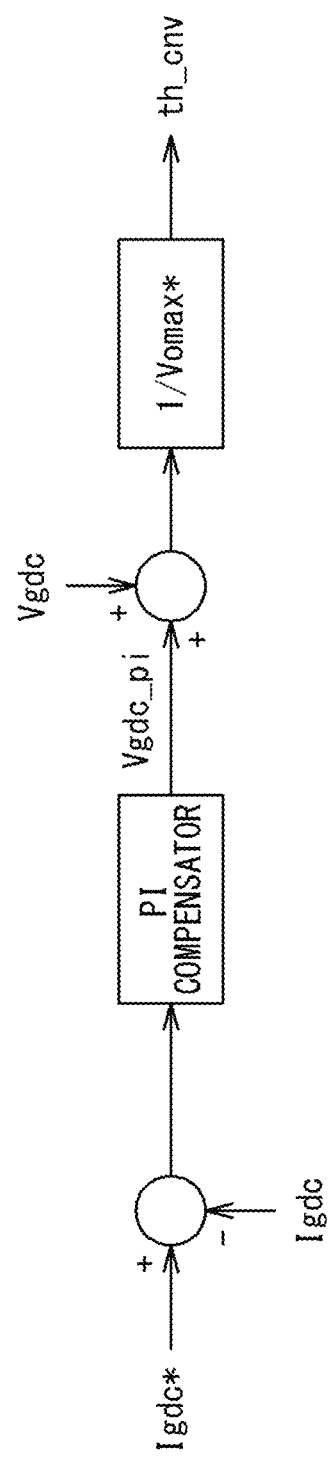
FIG. 7 is a control block diagram of DC reactor current control for calculating a reference wave threshold value for a DC/DC conversion unit.

FIG. 7 is a control block diagram of DC reactor current control for calculating a reference wave threshold value th_cnv for the DC/DC conversion unit 10. To describe briefly, this is a calculation for obtaining a reference wave threshold value (duty of control) for the DC/DC conversion unit 10 on the basis of the DC reactor current command value.

In FIG. 7, a difference between the DC reactor current command value Igdc* and a DC reactor current detection value Igdc is inputted to a PI compensator, and then a sum of the resultant value and the DC power supply voltage detection value Vgdc is divided by the DC bus voltage command value Vomax*, thereby determining the reference wave threshold value th_cnv for the DC/DC conversion unit 10.

A result of operation by an actual circuit in a case of using the above control method is shown below.

The operation condition is as follows.

DC power supply voltage: 52 V
Switching frequency: 20 kHz
Output voltage command value: 101 V (Waveform Diagram by Oscilloscope)

Figure 8:
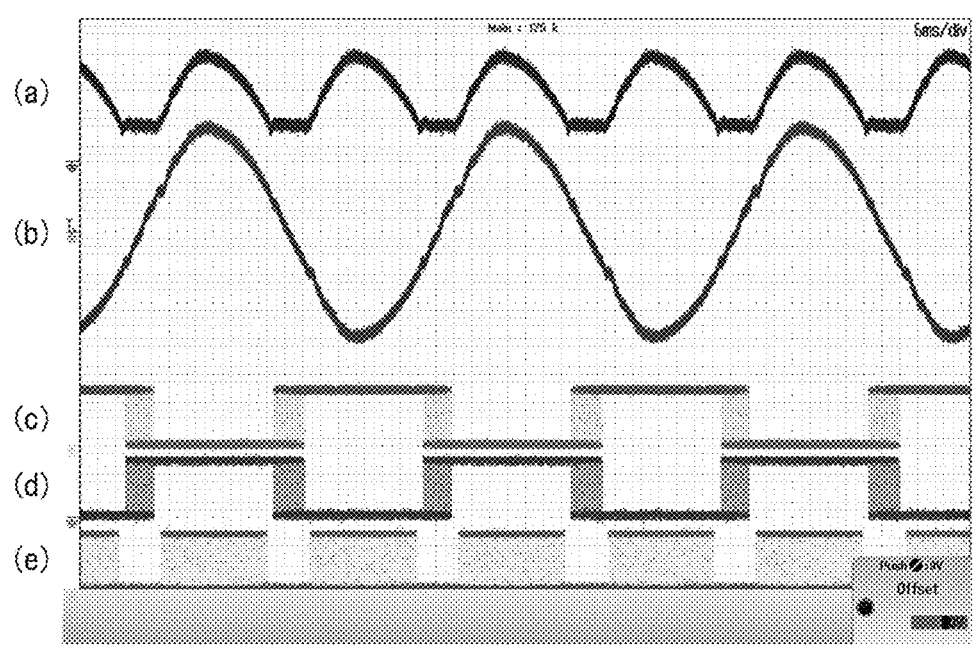
FIG. 8 is a diagram showing major waveforms in a case of no load.

FIG. 8 is a diagram showing major waveforms in a case of no load. The names of the respective waveforms are as follows.

(a) DC bus voltage
(b) Output voltage
(c) Gate voltages of the switching elements Q3, Q6 in the DC/AC conversion unit 11
(d) Gate voltages of the switching elements Q4, Q5 in the DC/AC conversion unit 11
(e) Gate voltage of the switching element Q2 in the DC/DC conversion unit 10

As shown in (a), the DC bus voltage waveform alternately has a period of a pulsating current waveform corresponding to the absolute value of an AC voltage and a period of the DC voltage as the pulsating current minimum value (not zero). During the period of the pulsating current waveform, step-up operation by the DC/DC conversion unit 10 is performed as shown in (e). Then, by switching of the DC/AC conversion unit 11 shown in (c) and (d), step-down operation is performed during the period of the DC voltage of the DC bus voltage waveform, to perform conversion into a waveform of the absolute value of the AC voltage corresponding to this period. In addition, the DC/AC conversion unit 11 performs polarity inversion per one pulsating current cycle.

As shown in (b), the output voltage has a shape of a smooth sine wave.

Switching (high-frequency switching) of the DC/AC conversion unit 11 is performed during a period in which the output voltage is equal to or smaller than the DC power supply voltage. During the other period, the gate voltages are ON or OFF and the switching is not performed.

The switching of the DC/DC conversion unit 10 is performed during a period in which the output voltage is equal to or greater than the DC power supply voltage, but is not performed during the other period. The switching periods of the DC/AC conversion unit 11 and the DC/DC conversion unit 10 do not overlap each other (it is noted that there is no problem even if they slightly overlap each other).

Owing to existence of switching stop periods, switching loss is small as a whole, and iron loss of the AC reactor 22 and the DC reactor 16 is also small. The output voltage effective value is 101.9 V, and the output voltage distortion rate is 3.5%, which is within a permissible range.

Figure 9:
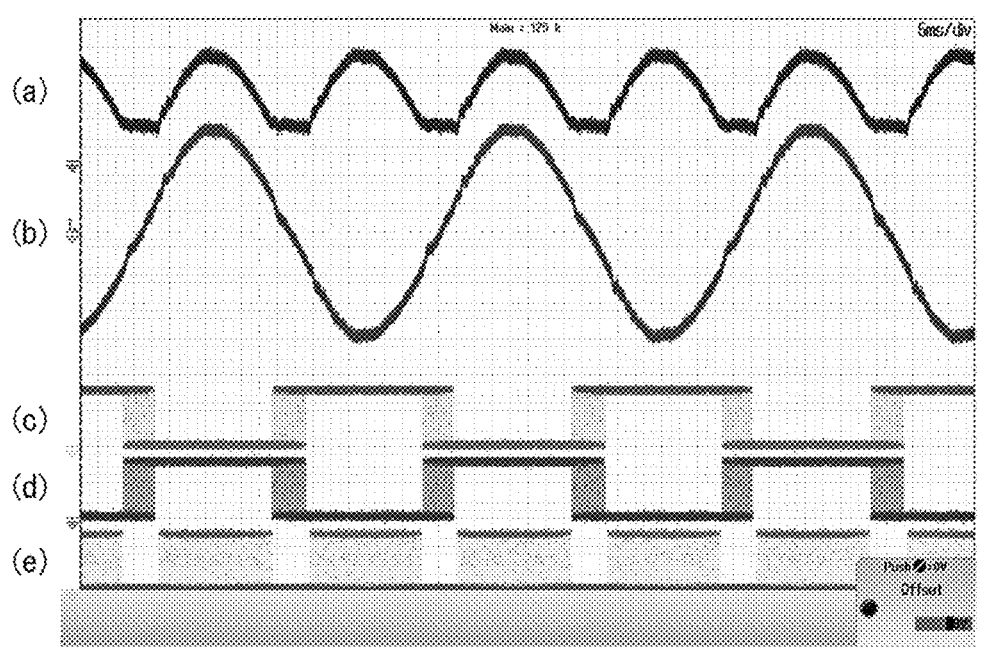
FIG. 9 is a diagram showing major waveforms in a case where a resistance load of 20Ω (power consumption: 500 W) is connected as an AC load.

FIG. 9 is a diagram showing major waveforms in a case where a resistance load of 20Ω (power consumption: 500 W) is connected as the AC load 3. The names of the respective waveforms are the same as those in FIG. 8.

As shown in (b), the output voltage has a shape of a smooth sine wave. In addition, as in the case of no load, the DC/DC conversion unit 10 and the DC/AC conversion unit 11 each have a switching stop period. The output voltage effective value is 101.3 V, and the output voltage distortion rate is 3.3%, which is within a permissible range.

«Summary of Control»

As shown in the above specific control example, the control unit executes the following operations (steps):

(a) determining duties of control for the DC/AC conversion unit 11 and the DC/DC conversion unit 10 by considering electric influences of the filter circuit 21, the capacitor 19, and the DC reactor 16 for the output voltage command value (Sinwave) for supplying an AC voltage to the load (calculation step), (b) controlling the DC/DC conversion unit 10 to convert the DC voltage into a DC bus voltage waveform alternately having a period of a pulsating current waveform corresponding to the absolute value of an AC voltage and a period of the DC voltage as a pulsating current minimum value (first conversion step), and (c) controlling the DC/AC conversion unit 11 to perform step-down operation during the period of the DC voltage and thus perform conversion into a waveform of the absolute value of the AC voltage corresponding to this period, and also to perform polarity inversion per one pulsating current cycle (second conversion step).

In the conversion device and the control method for executing such operations (steps), the DC/DC conversion unit 10 converts the DC voltage into a DC bus voltage waveform alternately having a period of a pulsating current waveform corresponding to the absolute value of an AC voltage and a period of the DC voltage. Further, the DC/AC conversion unit 11 performs step-down operation during the period of the DC voltage to generate a waveform of the absolute value of the AC voltage corresponding to this period, and performs polarity inversion per one pulsating current cycle, thereby generating a desired AC voltage. Thus, it is possible to provide the conversion device 1 in which loss due to high-frequency switching is suppressed and smoothness of the AC waveform is achieved. In addition, the duties for the respective conversion units 10, 11 are determined by considering an electric influence of the filter circuit 21 including the AC reactor 22, for example, whereby distortion caused when the AC reactor current command value varies can be suppressed.

«Others»

It is noted that the embodiments disclosed herein are merely illustrative in all aspects and should not be recognized as being restrictive. The scope of the present invention is defined by the scope of the claims, and is intended to include meaning equivalent to the scope of the claims and all modifications within the scope.

REFERENCE SIGNS LIST 1 conversion device
2 storage battery
3 AC load
10 DC/DC conversion unit
11 DC/AC conversion unit
12 control unit
14 voltage sensor
15 capacitor
16 DC reactor
17 current sensor
18 DC bus
19 capacitor
21 filter circuit
22 AC reactor
23 capacitor
24 current sensor
25 voltage sensor
26 current sensor
100 power supply device
d1 to d6 diode
Q1 to Q6 switching element

The invention claimed is:

1. A conversion device which converts a DC voltage inputted from a DC power supply, to an AC voltage in a non-insulated manner and supplies the AC voltage to a load, the conversion device comprising:

a filter circuit connected to the load and including an AC reactor and a first capacitor;

a DC/AC conversion unit provided between the filter circuit and a DC bus;

a second capacitor connected to the DC bus;

a DC/DC conversion unit provided between the DC bus and the DC power supply and including a DC reactor; and a control unit configured to control the DC/AC conversion unit and the DC/DC conversion unit, wherein the control unit determines duties of control for the DC/AC conversion unit and the DC/DC conversion unit by considering electric influences of the filter circuit, the second capacitor, and the DC reactor for an output voltage command value for supplying the AC voltage to the load, controls the DC/DC conversion unit to convert the DC voltage into a DC bus voltage waveform alternately having a period of a pulsating current waveform corresponding to an absolute value of the AC voltage and a period of the DC voltage as a pulsating current minimum value, and controls the DC/AC conversion unit to perform step-down operation during the period of the DC voltage and thus perform conversion into a waveform of the absolute value of the AC voltage corresponding to the period of the DC voltage, and also to perform polarity inversion per one pulsating current cycle, wherein the control unit at least executes:

a calculation for obtaining an AC reactor current command value on the basis of the output voltage command value by considering a current flowing through the first capacitor;

a calculation for obtaining a voltage command value for the DC bus on the basis of the output voltage command value by considering a voltage change due to the AC reactor and a voltage change due to the DC reactor;

a calculation for obtaining a reference wave threshold value for the DC/AC conversion unit on the basis of the AC reactor current command value;

a calculation for obtaining a DC reactor current command value on the basis of a reactive power due to a current flowing through the second capacitor and a power of the DC/AC conversion unit; and a calculation for obtaining a reference wave threshold value for the DC/DC conversion unit on the basis of the DC reactor current command value.

2. A control method for a conversion device which converts a DC voltage inputted from a DC power supply, to an AC voltage in a non-insulated manner and supplies the AC voltage to a load, the conversion device including: a filter circuit connected to the load and including an AC reactor and a first capacitor; a DC/AC conversion unit provided between the filter circuit and a DC bus; a second capacitor connected to the DC bus; a DC/DC conversion unit provided between the DC bus and the DC power supply and including a DC reactor; and a control unit configured to control the DC/AC conversion unit and the DC/DC conversion unit, the control method being executed by the control unit and comprising:
    a calculation step of determining duties of control for the DC/AC conversion unit and the DC/DC conversion unit by considering electric influences of the filter circuit, the second capacitor, and the DC reactor for an output voltage command value for supplying the AC voltage to the load;
    a first conversion step of controlling the DC/DC conversion unit to convert the DC voltage into a DC bus voltage waveform alternately having a period of a pulsating current waveform corresponding to an absolute value of the AC voltage and a period of the DC voltage as a pulsating current minimum value; and
    a second conversion step of controlling the DC/AC conversion unit to perform step-down operation during the period of the DC voltage and thus perform conversion into a waveform of the absolute value of the AC voltage corresponding to the period of the DC voltage, and also to perform polarity inversion per one pulsating current cycle, wherein the calculating step includes:
    a calculation for obtaining an AC reactor current command value on the basis of the output voltage command value by considering a current flowing through the first capacitor;
    a calculation for obtaining a voltage command value for the DC bus on the basis of the output voltage command value by considering a voltage change due to the AC reactor and a voltage change due to the DC reactor;
    a calculation for obtaining a reference wave threshold value for the DC/AC conversion unit on the basis of the AC reactor current command value;
    a calculation for obtaining a DC reactor current command value on the basis of a reactive power due to a current flowing through the second capacitor and a power of the DC/AC conversion unit and
    a calculation for obtaining a reference wave threshold value for the DC/DC conversion unit on the basis of the DC reactor current command value.

* * * * *